United States Patent [19]
Bailey et al.

[11] Patent Number: 5,535,973
[45] Date of Patent: Jul. 16, 1996

[54] UNIVERSAL CLAMP

[75] Inventors: James R. Bailey, Plainville; G. David Hood, Terryville; Alan A. Wasley, Southington, all of Conn.

[73] Assignee: Innovative Medical Products Inc., Plainville, Conn.

[21] Appl. No.: 324,267

[22] Filed: Oct. 17, 1994

[51] Int. Cl.⁶ .............................. A47B 96/06; E04G 3/00
[52] U.S. Cl. .................. 248/229.1; 248/214; 248/316.4; 248/316.5; 248/230.4
[58] Field of Search .............................. 248/229, 230.4, 248/231.4, 231.5, 214, 316.4, 316.5, 229.1, 231.41, 231.51; 403/113, 116, 240, 385, 388; 24/135 R, 135 N, 514, 525

[56] References Cited

U.S. PATENT DOCUMENTS

| | | | |
|---|---|---|---|
| 1,890,386 | 12/1932 | Kingston | 24/514 |
| 2,208,358 | 7/1940 | Chandler | 24/135 R |
| 3,169,739 | 2/1965 | Yacobian | 248/231.7 X |
| 3,781,963 | 1/1974 | Felser, Jr. | 29/201 |
| 3,809,338 | 5/1974 | Gross, Jr. et al. | 248/230 X |
| 4,003,119 | 1/1977 | Hugh | 29/254 |
| 4,068,365 | 1/1978 | Brandt et al. | 29/261 |
| 4,210,990 | 7/1980 | Krieger | 29/263 |
| 4,328,953 | 5/1982 | McBride | 254/134.4 R |
| 4,392,301 | 7/1983 | Hannes et al. | 29/741 |
| 4,598,936 | 7/1986 | Doll et al. | 285/18 |
| 4,649,615 | 3/1987 | Hundley | 29/261 |
| 4,761,869 | 8/1988 | Barry et al. | 29/261 |
| 4,870,741 | 10/1989 | Hansmann | 29/271 |
| 4,989,312 | 2/1991 | Maddalena | 29/259 |
| 5,341,553 | 8/1994 | Herzhauser | 29/261 |

FOREIGN PATENT DOCUMENTS

| | | | |
|---|---|---|---|
| 155567 | 8/1952 | Australia | 24/514 |
| 4012213 | 4/1990 | Germany | 248/316.5 |

*Primary Examiner*—Leslie A. Braun
*Assistant Examiner*—Brian J. Hamilla

[57] ABSTRACT

A self-adjusting clamp for use in medical applications allows a support post to be tightly retained against a substrate such as an operating table. A single control knob provides clamping facility to the support post as well as to the hooked ends of the clamp that engages the side edges of the operating table.

9 Claims, 4 Drawing Sheets

UNIVERSAL CLAMP

BACKGROUND OF THE INVENTION

A clamp used to support auxiliary equipment onto an operating table is described in U.S. Pat. No. 4,355,631 entitled "Surgical Retractor Apparatus with Improved Clamping Device". The clamp described within this patent utilizes a first knob to secure the clamp to the edges of the operating table and a second knob to secure the knob to an upright support post used to engage auxiliary medical equipment such as a surgical drape. When weight-bearing medical equipment such as the leg support used in knee surgery described in U.S. Pat. No. 4,136,858 it is important that the clamping device employed to secure the support post have sufficient holding force to remain intact during the long time requirements to repair the knee ligaments and cartilage.

Since sterile equipment is employed in all types of surgery, it is beneficial to use one hand to secure the associated medical apparatus to the operating table to minimize the risk of contamination.

One purpose of this invention is to describe a universal clamp that simultaneously attaches to the operating table and to the upright equipment support post and only requires a single knob in the process.

SUMMARY OF THE INVENTION

A universal surgical equipment clamp multi-functionally attaches an equipment support post to the operating table while securing the clamp itself. The clamp utilizes a single knob and employs a pair of hinged side pieces that are mirror-imaged from a single design.

DESCRIPTION OF THE PREFERRED EMBODIMENT

Figure 1:
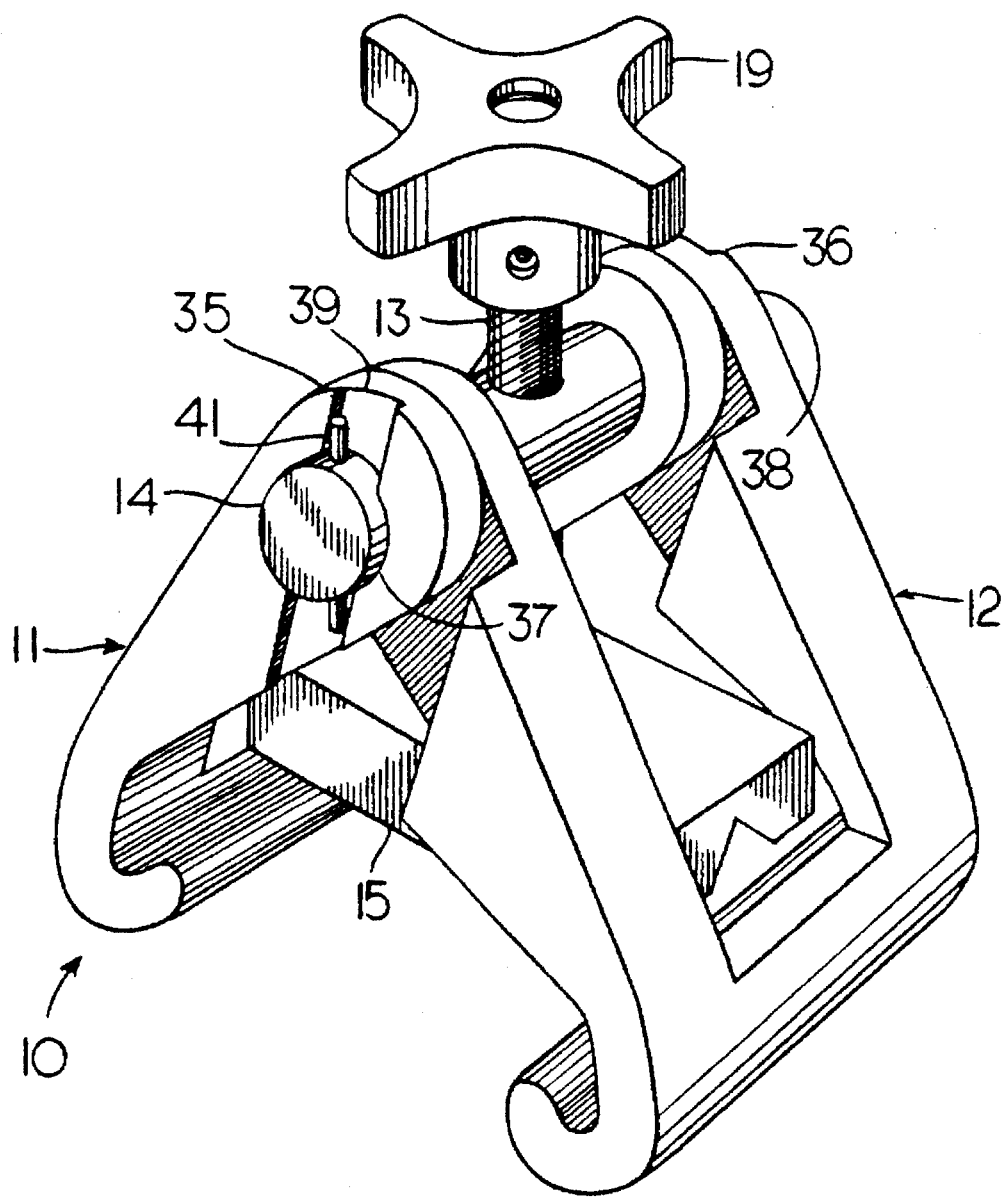
FIG. 1 is a top perspective view of the universal clamp according to the invention.

The universal clamp 10 according to the invention is shown in FIG. 1 and consists of a pair of side pieces 11, 12 that are fabricated from the same design such that one is the mirror image of the other. A threaded rod 13 extends downwardly and has a knob 19 at one end and a shaped plate 15 at the opposite end thereof. A support bar 14 extends between the radial ends 35, 36 of the side pieces and extends within the thru-holes 37, 38 formed therein. An elongated slot 39 in the radial end 35 of the side piece 11 interacts with the retainer-stop pin 41 extending through the end of the support bar 14 and serves to position and stop the travel of the associated side piece 11 as will be described below.

Figure 2:
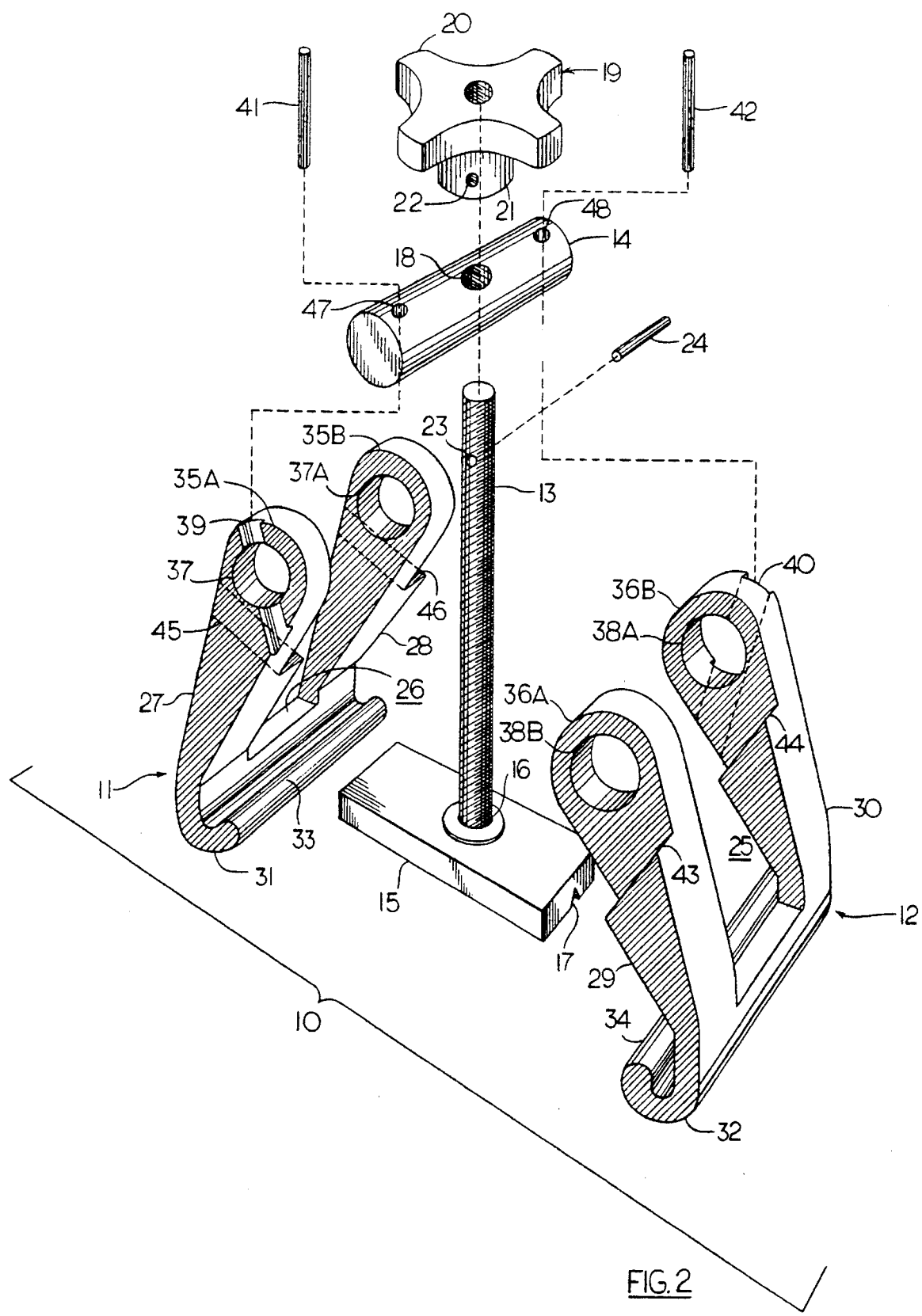
FIG. 2 is a top perspective view of the universal clamp of FIG. 1 with the components in isometric projection.

The universal clamp 10 is depicted in FIG. 2 prior to assembly. The side piece 11 is shaped to define the top radial ends 35A, 35B and associated arms 27, 28 joined by the bottom bight 31. The bight terminates in a hooked end 33 to better engage the edges of the operating table. An elongated U-shaped slot 26 is defined between the arms 27, 28 to provide clearance for the transport of the shaped plate 15 attached to bottom end of the threaded rod 13 by insertion within the threaded opening 16 on the top part of the shaped plate 15. A V-shaped slot 17 extends along the bottom of the shaped plate to facilitate contact with the support post (not shown) which supports the associated medical equipment. A similar side piece 12 having top radial ends 36A, 36B and associated arms 29, 30 are joined by the bottom bight 32. The bight 32 terminates in a hooked end 34 to better engage the edges of the operating table. An elongated U-shaped slot 25 is defined between the arms 29, 30 to provide clearance for the transport of the shaped plate 15. When assembled together, the radial ends 35A, 35B on the arms 27, 28 nest within the slots 43, 44 formed on the arms 29, 30 and the radial ends 36A, 36B nest within the slots 45, 46 formed on the arms 27, 28. The elongated slots 39, 40 interact with the associated retainer-stop pins 41, 42 which attach the support bar 14 to the side pieces 11, 12 by means of the thru-holes 47, 48 formed in the ends of the support bar, after the ends of the support bar have been received within the thru-holes 37, 37A, 38, 38A formed in the radial ends 35A, 35B and 36A, 36B. When the free end of the threaded rod has passed through the threaded opening 18 in the support bar 14 to within the stem 21 on the knob 19, it is attached by means of the rivet pin 24 and thru-holes 22 and 23. The handle grip 20 on the end of the knob facilitates rotation of the knob when the knob is later rotated to both tighten and release the clamp from the edge of the operating table.

Figure 3:
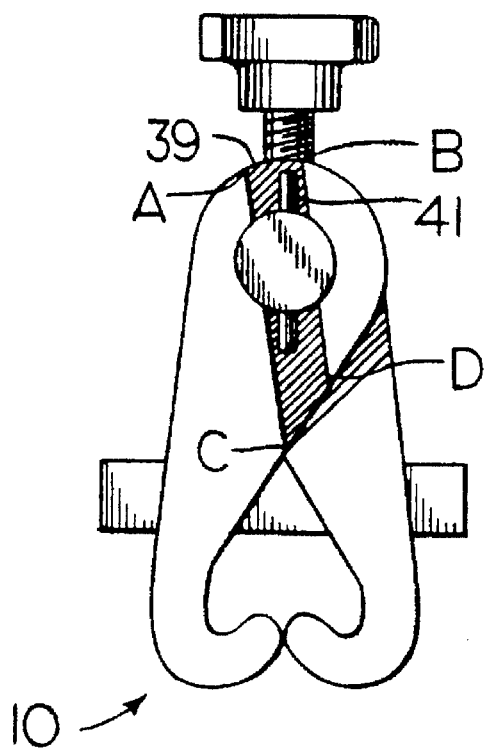
FIG. 3 is a side view of the universal clamp of FIG. 1 in a closed condition.

The control function of the retainer-stop pin 41 within the elongated slot 39 is best seen by now referring to FIG. 3 wherein the clamp 10 is depicted in the closed condition. The top left, top right, bottom left and bottom right edges of the slot are characterized as A, B, C, D respectively. In the closed condition, the retainer-stop pin 41 is aligned within the slot away from the edges.

Figure 4:
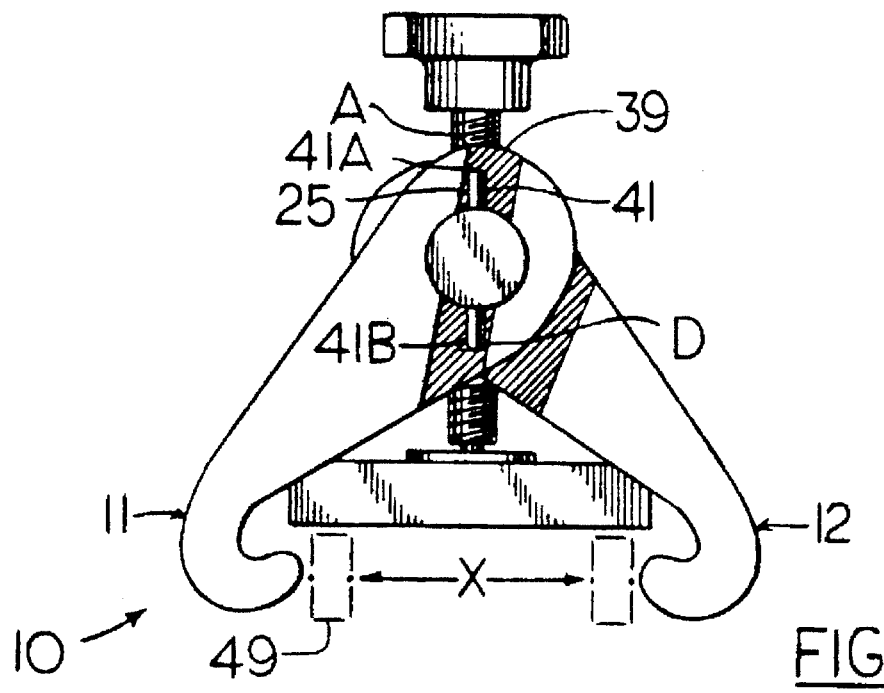
FIG. 4 is a side view of the universal clamp of FIG. 1 in an open position as viewed from one side.

In the open condition shown in FIGS. 4, the top end 41A of the retainer-stop pin 41 is against the top left edge A and the bottom end 41B is against the bottom right edge D as viewed from the left in FIG. 4. The contact between the edges of the slot and the ends of the retainer pin 41 to limit and accurately set the corresponding positions of the side pieces 11, 12 of the clamp 10 is an important feature of the invention. The completely open separation distance X can be adjusted for clearing the support edges of the operating table as indicated in phantom at 49. This prevents lost motion when the clamp is being attached and greatly assists the attendant working in the sterile field environment from missing the support edges and dropping the clamp.

Figure 5:
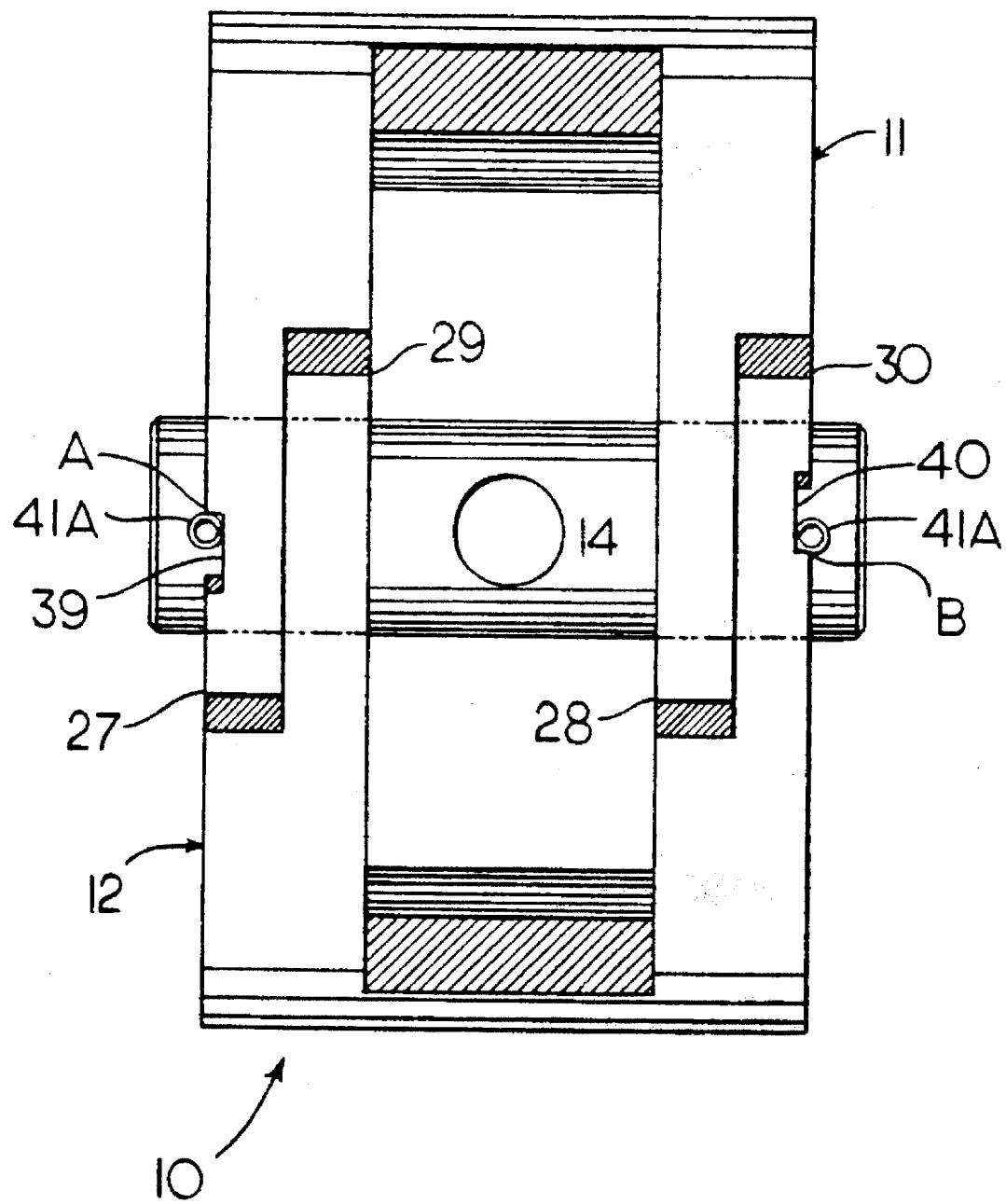
FIG. 5 is a top plan view of the universal clamp shown in FIG. 4.

The clamp 10 is shown in FIG. 5 with the knob removed to more clearly depict the relationship between the support bar 14 and the side pieces 11, 12. It is thus seen that the arms 27, 28 on the side piece 11 nestle between the arms 29, 30 on the side piece 12 to allow a close, compact clamp that utilizes a minimum of space on the operating table substrate. The top ends 41A of the associated retainer-stop pins 41 (FIG. 4) are depicted against the corresponding opposite top edges A, B of the elongated slots 39, 40 to limit and control the open position of the side pieces 11, 12 as described earlier.

A universal clamp has herein been described having utility in the sterile field environment of an operating room by rapid and simple attachment facility. The feed-back logic provided by the retainer-stop pins that secure the clamp side pieces reduces lost motion and accurately sets the position of the side pieces.

We claim:

1. A universal clamp comprising:

a pair of side pieces, each side piece defining a pair of arms joined at a lower end by a bight, each of said arms having an opening at an upper end opposite said bight;

a support bar extending within said openings and including a retainer-stop pin through each end and a thru-hole intermediate said ends;

a threaded rod having a knob at a first end and a plate at a second end, said threaded rod extending through said thru-hole for driving said side pieces between open and closed positions;

wherein said arms further include a recessed outer surface on said lower ends, whereby one of said arms on one of said side pieces travels within said recessed outer surface on another of said arms on another of said side pieces.

2. The universal clamp of 1 wherein said side pieces are mirror images of each other.

3. The universal clamp of claim 1 wherein said one of said arms stops against an edge of said recessed outer surface on said other of said arms.

4. A universal clamp comprising a pair of side pieces, each side piece defining a pair of arms joined at a lower end by a bight, each of said arms having an opening at an upper end opposite said bight;

a support bar extending within said openings and including a retainer-stop pin through each end and a thru-hole intermediate said ends;

a threaded rod having a knob at a first end and a plate at a second end, said threaded rod extending through said thru-hole for driving said side pieces between open and closed positions;

wherein each side piece includes an elongated clearance slot extending between said pair of arms from said upper end to said bight, said clearance slot receiving a portion of said plate to guide said plate when said knob is rotated to drive said side pieces between open and closed positions;

said arms further include a guide slot formed on an outer surface of said upper end, said guide slot defining edges therein, said retainer stop pin thereby interacting with said edges of said guide slot to limit movement of said arms to said open position.

5. The universal clamp of claim 4 wherein said bight includes a hook-shaped end adapted for engaging side edges of a support table.

6. The universal clamp of claim 4 wherein a top end of said retainer stop pin contacts a top end of said guide slot when said arms are in said open position.

7. The universal clamp of claim 6 wherein said top end of said retainer stop pin is away from said top end of said guide slot when said arms are in said closed position.

8. The universal clamp of claim 4 wherein a bottom end of said retainer stop pin contacts a bottom end of said guide slot when said arms are in said open position.

9. The universal clamp of claim 8 wherein said bottom end of said retainer stop pin is away from said bottom end of said guide slot when said arms are in said closed position.

* * * * *